UNITED STATES PATENT OFFICE.

FRANCIS F. BOUDRYE, OF SAN FRANCISCO, CALIFORNIA, ASSIGNOR OF ONE-HALF HIS RIGHT TO JULES NIHY, OF SAME PLACE.

IMPROVEMENT IN COMPOSITIONS FOR DRAIN-PIPES.

Specification forming part of Letters Patent No. 146,864, dated January 27, 1874; application filed April 17, 1873.

*To all whom it may concern:*

Be it known that I, FRANCIS FELIX BOUDRYE, of the city and county of San Francisco, State of California, have invented a certain Composition for the Manufacture of Drain-Pipes, Mortar, Cement, and other similar articles, of which the following is a specification:

This calcareous compound is found ready prepared at nearly all gas-works, being thrown out in heaps for carting away, and designated as foul lime, waste lime, or refuse lime, and they consist of lime and sulphate of lime, saturated wholly, or in part, with the impurities distilled over in the manufacture of the ordinary illuminating-gas of commerce, such as ammonia, carbonic acid, and sulphureted hydrogen, forming a mixture of carbonate of lime, hydrosulphate of lime, lime untouched, hydrosulphate of ammonia, and sulphuret of calcium, united in variable proportions, according to the properties and qualities of the coal distilled into gas.

To prepare the compound for its application as a mortar and cement, take a quantity of this refuse calcareous material and reduce it to a fine powder; then add sufficient water to make it into a thin paste, and to this paste add coarse sand and hair, after the manner and in about the same proportions usually adopted in the manufacture of ordinary mortar, the calcareous material being made in this case to supply the place of the slaked lime generally used in the preparation of mortar. The mortar thus made can be applied with advantage to the building of ordinary brick houses, and also as a substitute for the first layer of plaster usually spread on laths in walls and partitions. To prepare the cement a mortar composition is made, as already described, without the addition of the hair, and with or without the addition of the sand, and a small percentage of ordinary cement is well stirred into the paste during its manufacture, so that the whole may form a compound suitable for binding together of large stones or bricks in the erection of buildings requiring considerable strength.

For the manufacture of drain-pipes this calcareous refuse material is ground, as before, into a fine powder, and is mixed with coarse sand, plaster-of-paris, or cement, either separately or combined with one another, with the addition of sufficient water to make the whole into a thick paste, according to the quality of the pipe to be manufactured. If a pipe be required of no extraordinary strength, about equal parts of the finely-powdered calcareous material and coarse sand are made with water into a thick paste. The compound thus prepared is placed gradually into ordinary drain-pipe molds, and well rammed down into them under great pressure, so that when the composition is properly set, these molds can be withdrawn and the completed pipes disengaged in order to attain their requisite hardness. When a pipe is required of some considerable strength, equal parts of the finely-powdered calcareous material and sand are mixed with about one-fifth of their joint weight of ordinary cement, and the compound thus formed is made into a thick paste by the addition of a sufficient quantity of water, and then pressed into molds for the required shape and hardness, as before. When a very superior drain-pipe is to be constructed, about one-half of the ordinary cement employed in this last case is replaced by an equal weight of plaster-of-paris.

For general use, it is proposed to pulverize this refuse calcareous material and pack such fine powder into barrels, so that it may be at once ready to be mixed with sand, cement, plaster-of-paris, &c., according to the strength of the combinations required.

I am aware that no claim can be made to the manufacture of this calcareous material, as it is the waste product of most gas-factories; but

What I claim as my invention, and desire to obtain Letters Patent for, is—

A calcareous compound for the manufacture of pipes, cement, mortar, &c., consisting essentially of refuse gas-lime, alone or mixed with cement, plaster-of-paris, or sand, either used separately or combined with one another, substantially as and for the purposes specified.

FRANCIS FELIX BOUDRYE.

Witnesses:
SAMUEL HERMANN,
LIONEL VARICAS.